(12) United States Patent
Vaccari

(10) Patent No.: US 10,138,923 B2
(45) Date of Patent: Nov. 27, 2018

(54) SELF LOCKING SAFETY SPRING CLIP

(71) Applicant: FERPLAST S.p.A., Castelgomberto (IT)

(72) Inventor: Carlo Vaccari, Castelgomberto (IT)

(73) Assignee: Ferplast S.p.A. (IT)

( * ) Notice: Subject to any disclaimer, the term of this patent is extended or adjusted under 35 U.S.C. 154(b) by 0 days.

(21) Appl. No.: 15/518,464

(22) PCT Filed: Oct. 19, 2015

(86) PCT No.: PCT/EP2015/074186
§ 371 (c)(1),
(2) Date: Apr. 11, 2017

(87) PCT Pub. No.: WO2016/087111
PCT Pub. Date: Jun. 9, 2016

(65) Prior Publication Data
US 2017/0241470 A1    Aug. 24, 2017

(30) Foreign Application Priority Data

Dec. 5, 2014  (IT) .............................. VR2014A0304

(51) Int. Cl.
*F16B 45/02* (2006.01)
*F16B 1/00* (2006.01)
*A01K 27/00* (2006.01)

(52) U.S. Cl.
CPC ............ *F16B 45/02* (2013.01); *A01K 27/005* (2013.01); *F16B 1/00* (2013.01); *F16B 2001/0035* (2013.01)

(58) Field of Classification Search
CPC .... F16B 45/02; F16B 1/00; F16B 2001/0035; A01K 27/005
See application file for complete search history.

(56) References Cited

U.S. PATENT DOCUMENTS 9,032,594 B1 * 5/2015 Mitchell ................. F16B 45/02
24/303
9,080,595 B1 * 7/2015 Mitchell ................. F16B 45/04
(Continued)

FOREIGN PATENT DOCUMENTS

DE      102009023937 A1   12/2010
FR           3002156 A1    8/2014
WO    WO-2013093342 A2 *  6/2013   ......... A62B 35/0087

OTHER PUBLICATIONS

International Search Report and Written Opinion—PCT/EP2015/074186—ISA/EPO—dated Jan. 12, 2016.

*Primary Examiner* — Robert Sandy
*Assistant Examiner* — Louis A Mercado
(74) *Attorney, Agent, or Firm* — Seyfarth Shaw LLP

(57) ABSTRACT

Described is a self locking safety spring clip including at least a main body (21) provided with an opening (38) designed to receive a ring. The main body (21) houses a first locking element (25) equipped at an end with a hook-shaped part or hook (26) and rotatable about a first pin (27) integral with the main body, as well as a second locking element (29) opposite the previous one, rotatable about a second pin (30) integral with the main body, the second locking element (29) being equipped with a magnetic element (31) designed to attract the ring thus facilitating the coupling and simultaneously the locking to the hook-shaped part or hook (26).

4 Claims, 3 Drawing Sheets

(56) References Cited

U.S. PATENT DOCUMENTS

| | | | |
|---|---|---|---|
| 9,777,763 B2 * | 10/2017 | Mitchell | F16B 45/02 |
| 2008/0250615 A1 * | 10/2008 | Emenheiser | F16B 45/02 |
| | | | 24/599.5 |
| 2009/0049663 A1 | 2/2009 | Hong | |
| 2012/0060332 A1 | 3/2012 | Mitchell | |
| 2012/0297590 A1 | 11/2012 | Spataro | |
| 2015/0047154 A1 * | 2/2015 | DeBien | F16B 45/02 |
| | | | 24/303 |
| 2015/0322996 A1 * | 11/2015 | Mitchell | F16B 45/04 |
| | | | 24/303 |
| 2017/0188547 A1 * | 7/2017 | Durfee | A01K 27/005 |

* cited by examiner

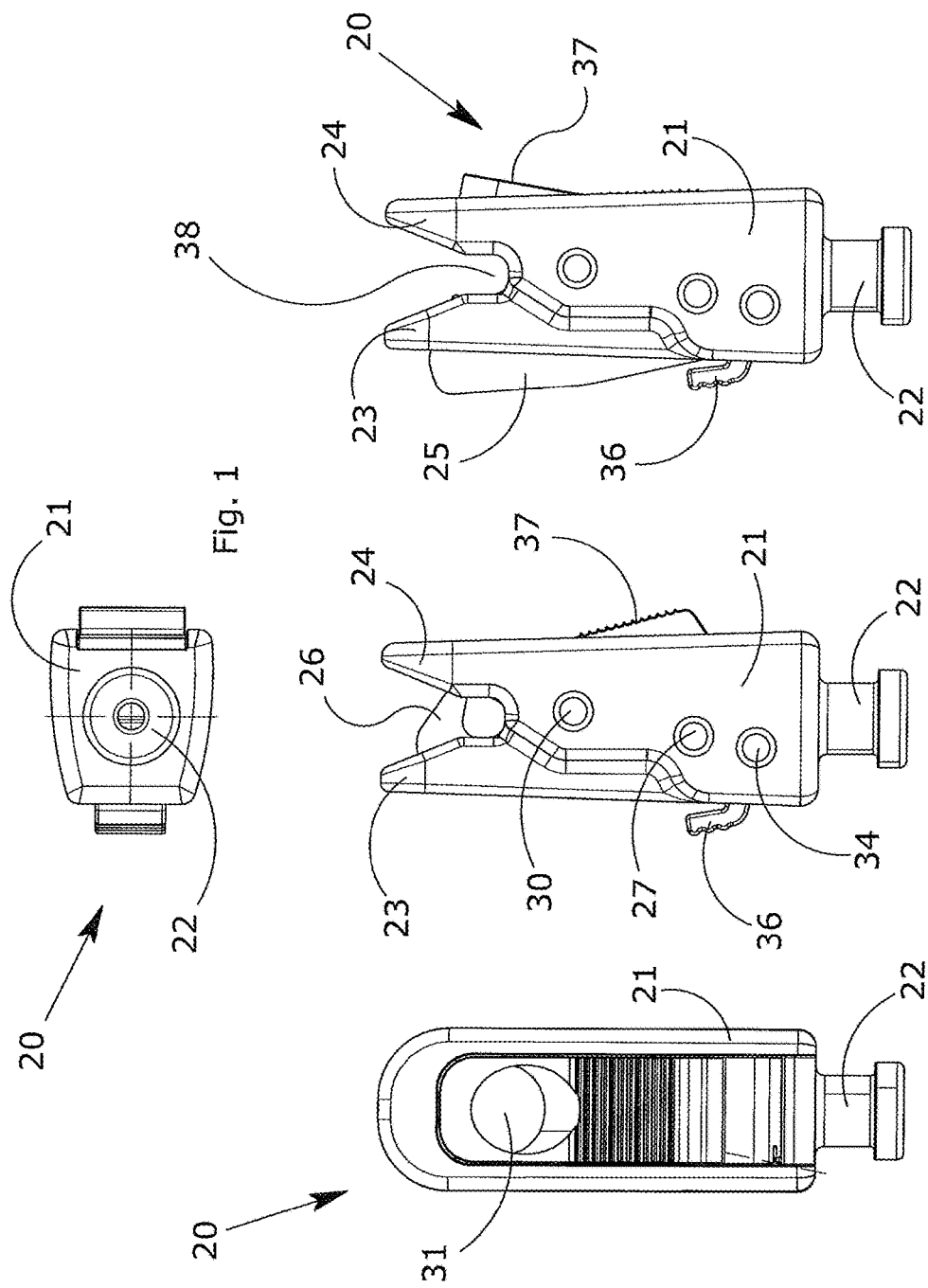

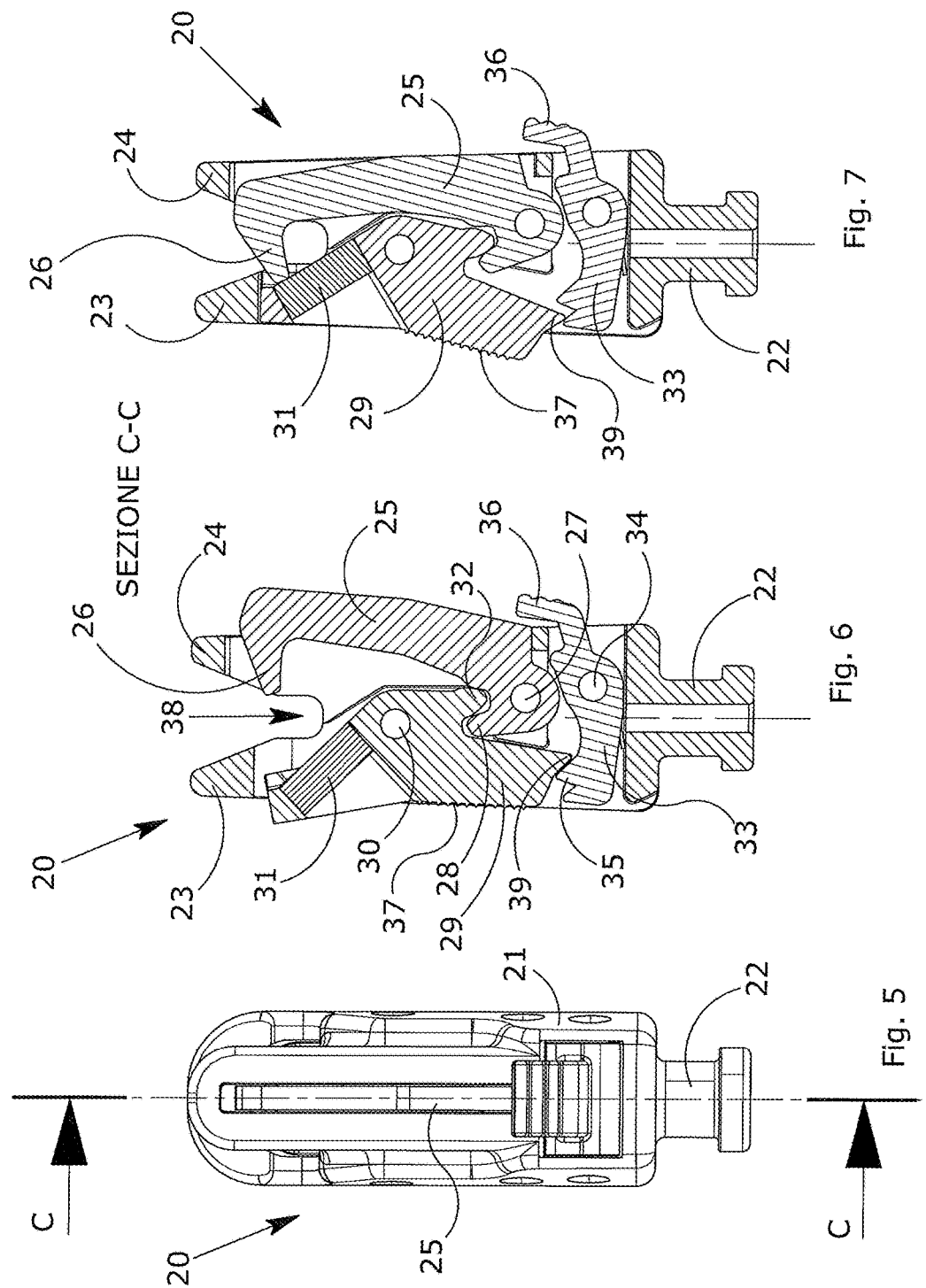

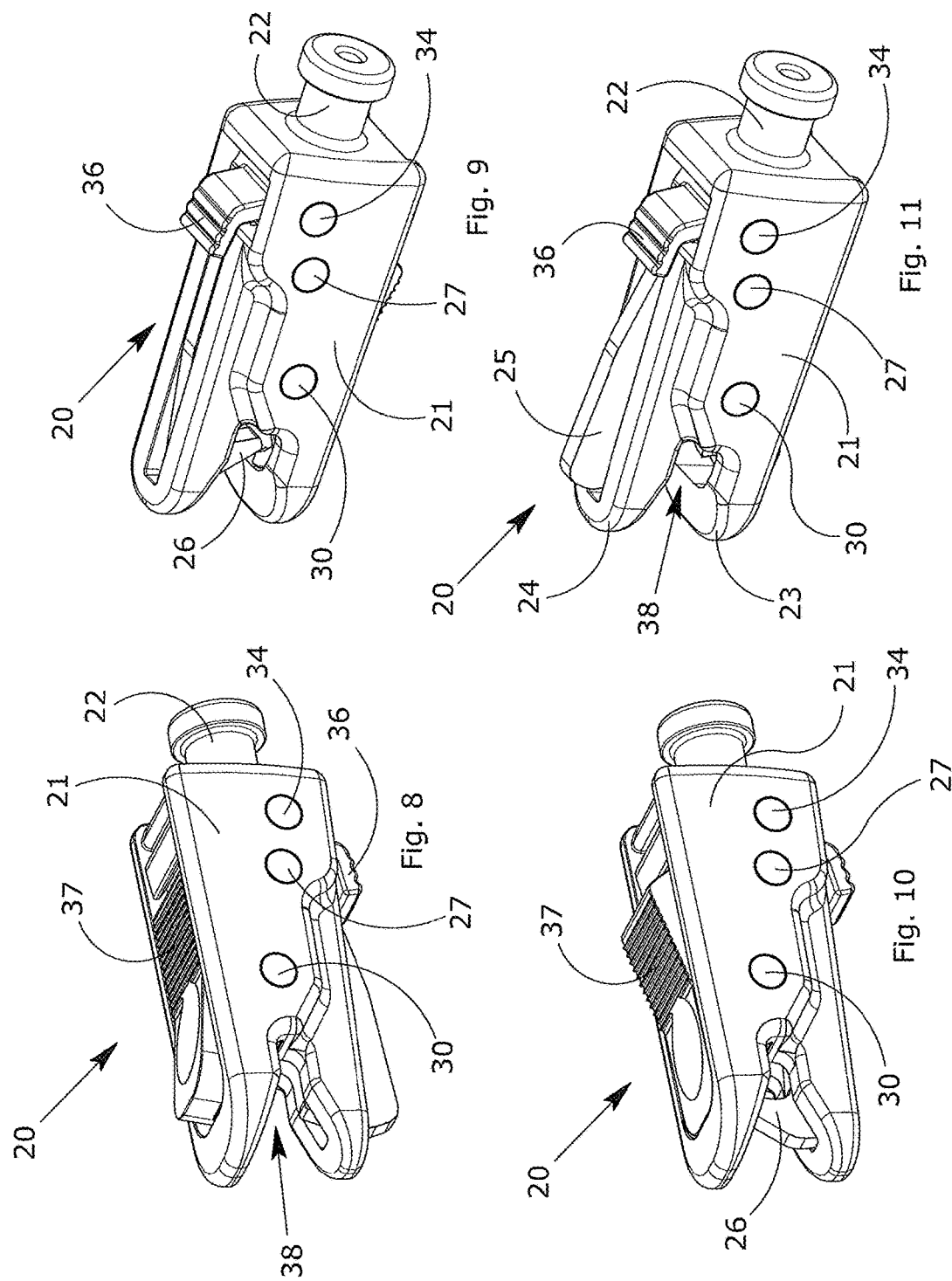

SELF LOCKING SAFETY SPRING CLIP

TECHNICAL FIELD

This invention relates to a self locking safety spring clip.

It is an automatic coupling spring clip with can be used mainly but not exclusively for coupling the leash to the collars of pets, such as for example dogs, but also for many other applications, such as for example for uses in the sports, nautical or mountaineering sectors, or for other uses in which it is necessary to fasten a rope or the like to a ring or the like.

Unlike the traditional solutions on the market, the spring clip according to the invention proposes that the coupling is performed in an almost automatic and self locking mode, that is, simply placing the gripping end next to the coupling element results in the instantaneous coupling in conditions of maximum safety, that is, preventing any possibility of release unless the opening system is used, which can be operated only by actuating a particular combination of conditions.

This invention can be applied in the field of accessories for pets, and, more specifically, in the sector of retaining means for dogs or other similar pets, but also in many other sectors such as, for example, in that sports, nautical or mountaineering sector, or in that of packaging, or applications which involve the use of tie rods, or many others.

BACKGROUND ART

The application in question consists of a spring clip which is very well known for use in many sectors and in a very wide range of applications and hereinafter consideration will only be given to a few, meaning that many others are in any case included.

According to the prior art, a spring clip, which may have different shapes and is usually made of steel or lightweight alloys, has one side which can be opened by a lever, if necessary locked by a ring nut. It is used where it is necessary to join elements in a quick, safe and reusable manner, and for this reason it is often used for sports such as climbing, mountaineering, paragliding and caving, but also for uses, for example, for attaching the leash to the collar of pets.

In effect, pets and in particular dogs, are walked outdoors using leashes, the strap of which can be fastened in some cases to the collar applied to the neck of the animal, or in other cases to a harness, which retains the animal not by the neck but by the entire front part of the body.

Again in the case of pets, it is also known that the leash is equipped at one end with a grip which allows it to be gripped by the owner and at the other end with a spring clip for attaching it to the collar.

In any case, the spring clip generally consists of a central body having a first longitudinal end provided with a ring for fixed connection with the leash, and a second hook-shaped end or hook which can be closed by a pin slidable in an axial direction in order to attach to the object to be retained, such as the ring of the collar, or other element.

The pin has elastic loading means designed to hold it in the closed position so that in order to release the spring clip from the collar it is necessary to grip the relative central body with one hand and exert an action with the thumb of the other hand on the pin aimed at opening the coupling means.

The same operations are however essential for coupling the spring clip to the collar, requiring a certain care in it execution by the user.

A first drawback is due to a certain difficulty in the step of coupling the spring clip to the retaining element, since a certain pressure must be exerted to open the closing device whilst trying to attach the spring clip to the gripping ring or other retaining element.

A further drawback is represented by the fact that the releasing of the spring clip is often difficult especially as a result of the fact that the animal, feeling that it is restrained, tends to make sudden movements which hinder the action by the owner.

In other contexts, such as the sports, nautical and mountaineering sectors, in which a certain speed of action is required, especially in emergency situations, the coupling and release of the traditional spring clips can be very difficult and in some cases become even dangerous due to unforeseeable consequences resulting from a lack of speed and precision during the coupling and/or releasing steps.

These situations constitute risks for the user who in the case of a leash may be subjected to strong tugs if the animal is large, whilst in other cases the owner may be subjected to unexpected and uncontrollable consequences.

Another drawback found by the operators in the "pet comfort" sector is represented by the fact that during the coupling of the traditional spring clip to the collar of the animal it is necessary to manually open the closing pin of the hook with inevitable retaining of the pet's collar.

Also in this case it is not easy to control since the animal tends to move both when it is freed and when it is about to be attached to the leash.

DESCRIPTION OF THE INVENTION

The aim of this invention is to provide a safety spring clip of the self locking type which is able eliminate or significantly reduce the above-mentioned drawbacks.

The aim of this invention is also to provides a self locking spring clip which is simple to produce and, at the same time, of high quality, thus obtaining a finished product of significant interest for the customer.

This is achieved by means of a self locking spring clip whose features are described in the main claim.

The dependent claims of the solution according to this invention describe advantageous embodiments of the invention.

The self locking safety spring clip according to this invention comprises:

- a main body for fixing, for example, to the strap of a leash or to another retaining element for example with the hands, the main body being equipped with guide means which allow quick centring of the spring clip with the object to be attached, for example to the ring of a collar for retaining a pet;
- a first articulated element or hook whose hook shaped end interferes in the guide area of the main body;
- a second articulated element opposite the previous one equipped with magnetic type means designed to attract the body to be retained, facilitating the coupling, and simultaneously equipped with a mechanical profile which acts on the first hook shaped element so as move it from an open position to a closed position and vice versa.

According to a preferential embodiment of the spring clip according to the invention, there is a third articulated element of the type with a lever and positioned in contrast with the spring at the base of the two previous articulated elements so as to interfere with both, and it constitutes an element for safely locking the spring clip in the closed and which is actuated like a control knob to allow opening of the spring clip.

To allow the closing of the spring clip on the element to be fastened, for example on the ring of a collar, it is sufficient to insert the element in the guide area of the main body allowing the magnet to be attracted, moving angularly, determining in this way the opposite movement of the hook which will move angularly tripping against the magnet.

In order to open the spring clip, pressure is applied with the fingers of the user on a side of the second component which frees the articulated first element and on the other side on a point for pushing the third articulated element, overcoming the magnetic attraction and moving the hook to the open position with immediate release of the retaining element.

Therefore, if one wishes to release the grip of the spring clip from the retaining element, it is necessary to simultaneously push the body with the magnet and the lever, thus preventing the possibility of error.

In that way, the opening of the spring clip occurs easily with the use of one hand by the user and with a simple action pressing on two opposite points of two of the three movable elements it is composed of.

If the spring clip according to the invention is used as a means for connecting between a leash and a collar to which a pet is constrained, the convenience and practical nature of the steps for coupling to and releasing from the ring of the collar are clear, since all the user has to do is move the spring clip close to the ring of the collar which will automatically trip the magnet which will attract the locking hook to it.

DESCRIPTION OF THE DRAWINGS

Other features and advantages of the invention will become clear on reading the description given below of one embodiment, provided as a non-limiting example, with the help of the accompanying drawings, in which:

FIG. 1 is a schematic view highlighting the side of the base of the spring clip according to the invention;

FIG. 2 is a schematic side view of the spring clip according to the invention;

FIG. 3 is the schematic side view of the spring clip according to the invention rotated by 90° on the longitudinal axis relative to the previous view and with the locking devices in the closed position;

FIG. 4 is the schematic view of the spring clip according to the invention with the locking devices in the open position;

FIG. 5 shows a lateral view of the spring clip according to an angle of 180° relative to the view of FIG. 2;

FIGS. 6 and 7 show cross sections of the spring clip according to the invention with the retaining means in the open position and the closed position, respectively;

FIGS. 8 to 11 show schematic views of the spring clip according to the invention represented by two angles and in two different operating steps, in particular FIGS. 8 and 11 are in the open position and FIGS. 9 and 10 are in the closed position.

DESCRIPTION OF AN EMBODIMENT OF THE INVENTION

With reference to the accompanying drawings, the numeral 20 denotes in its entirety a self locking spring clip according to the invention which, in the embodiment illustrated, substantially consists of four components mutually assembled together.

These components are represented by:

a main body 21 which on one side has means 22 for fixing, for example, to the strap of a leash or to another retaining element for example with the hands, and on the other side, that is, the side opposite the fixing means 22, the main body being equipped with guide means of the fork type with projections 23 and 24 which allow quick centring of the spring clip with the object to be attached;

a first element 25, one end of which is shaped like a hook 26 which interferes in the guide area of the main body, the first element being mobile and rotating around a pin 27 restrained to the main body 21, the first element 25 being equipped with a tooth 28 in proximity to the pin 27;

a second element 29 opposite the previous one with respect to the longitudinal centre line of the main body 21, movable rotatably about a pin 30 constrained to the main body 21, and equipped with a magnetic element 31, designed to attract the body to be retained facilitating the coupling and simultaneously equipped with a mechanical profile comprising a tooth which interacts with the tooth 28 of the first hook type element 25 so as to move it from an open position to a closed position and vice versa.

This embodiment also comprises a third articulated element of the lever type 33, which performs safety means functions, movable rotatably about a pin 34 and positioned in contrast with a spring (not illustrated in the drawings) at the base of the two preceding elements 25, 29 so as to interfere with both, the lever being provided on one side with a shaped end 35 and on the other side with a element 36 for gripping with the fingers, the third lever element 33 constituting the element for locking the spring clip in the closed position and which must be operated like a control knob to allow the opening of the spring clip.

Along the outer edge of the second element 29 hinged on the pin 30 and equipped with the magnetic element 31 there is a knurled surface 37 which acts as a gripping and pushing element for the fingers in the opposite direction relative to the gripping element 36 of the lever 33.

From an operational point of view, the self locking spring clip according to the invention allows the element to be retained, which typically comprises a metal ring, in particular made of ferromagnetic metal, to be retained in the seat 38, positioned inside the guide fork of guide, which determines a fully automatic operation of the spring clip.

Starting from the open position shown in FIGS. 4, 6, 8 and 11, the ring which is inserted in the seat 38 attracts towards itself the magnet 31 causing the angular movement of the element 29 which, rotating on the pin 30, moves the tooth 32 causing the consequent angular movement of the element 25, in such a way that the hook makes contact with the magnet 31, reaching the position illustrated in FIG. 7, in which the hook 26 closes the seat 38, by abutting against the magnet 31.

During this step, the safety lever 33 being placed in contrast with a spring, when the end 39 of the second element 29 moves rotating towards the outside the spring clip is locked in the closed position. In effect, the end 39 of the second member 29 inserts inside a socket 35 provided at an end of the lever 33 thus blocking the return of the second element 29 which in turn prevents the first element 25 from opening, by the mutual interaction of the teeth 28 and 32.

To open the spring clip, two fingers act on two opposite points, on one side on the gripping element 36 of the lever 33 and on the other side on the knurling 37 of the second element 29, allowing the teeth around the socket 35 to free the end 39 of the second element 29, whose rotation in the opposite direction to the previous one determines the opening of the hook 26 again freeing the seat 38, thus allowing the retaining element to be freed.

If the retaining element is of the ferromagnetic type, that is to say, inert to magnetic fields, for example made of a non-metallic material, the closing of the spring clip according to the invention occurs in manual mode, by pressing on the second articulated element and more specifically on the knurled part which in this way becomes a button.

In this case, the pressure exerted by the button determines the rotation of the second body 29 and the consequent rotation in the opposite direction of the first body 25, allowing the hook 26 to make contact with the magnet 31, creating also in this case a condition of safe closing since the lever 33 again interferes with the end 39, preventing the return.

As may be seen, the spring clip according to the invention is simple and safe to use being equipped with dual safety which prevents the spring clip from opening accidentally, avoiding the very dangerous situations described above which could have occurred with traditional spring clips which could also have caused unforeseeable events due to the lack of safety, speed and precision during the coupling and release steps.

The invention as described above refers to a preferred embodiment. It is nevertheless clear that the invention is susceptible to numerous variations which lie within the scope of its disclosure and within the framework of the technical equivalents as described in the claims below.

The invention claimed is:

1. A self locking safety spring clip, comprising:
   at least a main body provided with an opening designed to receive retaining means, wherein the main body houses:
      a first locking element equipped at an end with a hook-shaped part or hook and rotatable about a first pin integral with the main body, the first locking element, comprising a first tooth on a side of the first locking element opposite the hook, and
      a second locking element opposite the first locking element, rotatable about a second pin integral with the main body, the second element having a mechanical profile, comprising a second tooth operable with the first tooth of the first element, both the first tooth and the second tooth arranged outside the opening of the main body to move the first locking element from an open position to a closed position and vice versa,
   wherein the second locking element being equipped with an element designed to magnetically attract the retaining means thus facilitating coupling and simultaneously locking to the hook-shaped part or hook.

2. The self-locking safety spring clip according to claim 1, in which the main body (21) has, on one side, means for fixing to the retaining means and, on another side, the opening (38) is defined by forked protrusions (23, 24) which enable quick centering of the spring clip to an object to be fastened.

3. The self locking safety spring clip of claim 1, further comprising:
   a lever element rotatable about a third pin integral with the main body and positioned in contrast with a base of the first and second locking elements so as to interfere with both, the lever element being provided on one side with a socket and on the other side with a gripping element including fingers, the lever element operable for locking the spring clip in the closed position and operable as a control knob to allow the opening of the spring clip.

4. The self locking safety spring clip of claim 3, in an outer edge of the second locking element hinged on the second pin comprises a knurling (37) which acts as a gripping and pushing element for the fingers in an opposite direction relative to the gripping element (36) of the lever element.

* * * * *